United States Patent [19]
Ji

[11] Patent Number: 5,862,002
[45] Date of Patent: Jan. 19, 1999

[54] ELECTROSTRICTIVE ACTUATED MIRROR ARRAY AND METHOD FOR THE MANUFACTURE THEREOF

[75] Inventor: Jeong-Beom Ji, Seoul, Rep. of Korea

[73] Assignee: Daewoo Electronics Co., Ltd., Seoul, Rep. of Korea

[21] Appl. No.: 999,541

[22] Filed: Jan. 22, 1997

Related U.S. Application Data

[63] Continuation of Ser. No. 312,573, Sep. 27, 1994, abandoned.

[30] Foreign Application Priority Data

Sep. 28, 1993 [KR] Rep. of Korea .................. 1993-20259

[51] Int. Cl.⁶ ..................................................... G02B 5/08
[52] U.S. Cl. ......................... 359/846; 359/224; 359/291; 359/855; 310/328; 310/366
[58] Field of Search ..................................... 359/846, 848, 359/849, 853, 855, 869, 872, 224, 291, 295; 310/328, 333, 366

[56] References Cited

U.S. PATENT DOCUMENTS

| | | | |
|---|---|---|---|
| 5,083,857 | 1/1992 | Hornbeck | 359/291 |
| 5,212,582 | 5/1993 | Nelson | 359/224 |
| 5,392,151 | 2/1995 | Nelson | 359/223 |
| 5,434,697 | 7/1995 | Ameer | 359/224 |
| 5,469,302 | 11/1995 | Lim | 359/846 |
| 5,506,720 | 4/1996 | Yoon | 359/846 |

*Primary Examiner*—Kenneth B. Wells
*Attorney, Agent, or Firm*—Anderson, Kill & Olick, P.C.

[57] ABSTRACT

An array of M×N electrostrictive actuated mirrors for use in an optical projection system is prepared by using a relatively thick (100–150 μm) electrostrictive ceramic wafer whose mechanical properties remain intact, which in turn facilitates the manufacturing process, comprising the steps of: (a) preparing a ceramic wafer made of an electrostrictive material, having top and bottom surfaces; (b) providing on the top surface of the ceramic wafer M vertically oriented first trenches; (c) filling the M trenches with an electrically conductive material; (d) providing N−1 horizontally oriented grooves; (e) covering the top surface, including the N−1 grooves thereon, with a layer of a dielectric material; (f) mounting the ceramic wafer on an active matrix; (g) providing a metallic layer on the bottom surface of the ceramic wafer; (h) forming a photoresistive layer on top of the metallic layer; (i) forming on the ceramic wafer N−1 horizontally oriented cuts, thereby forming an array of M×N actuating members; (j) forming on the ceramic wafer M vertically oriented second trenches; (h) removing the photoresistive layer; (l) placing an array of M×N hinges; (m) forming a mirror on each of the M×N hinges; and (n) making electrical connections to thereby form an array of M×N electrostrictive actuated mirrors.

11 Claims, 5 Drawing Sheets

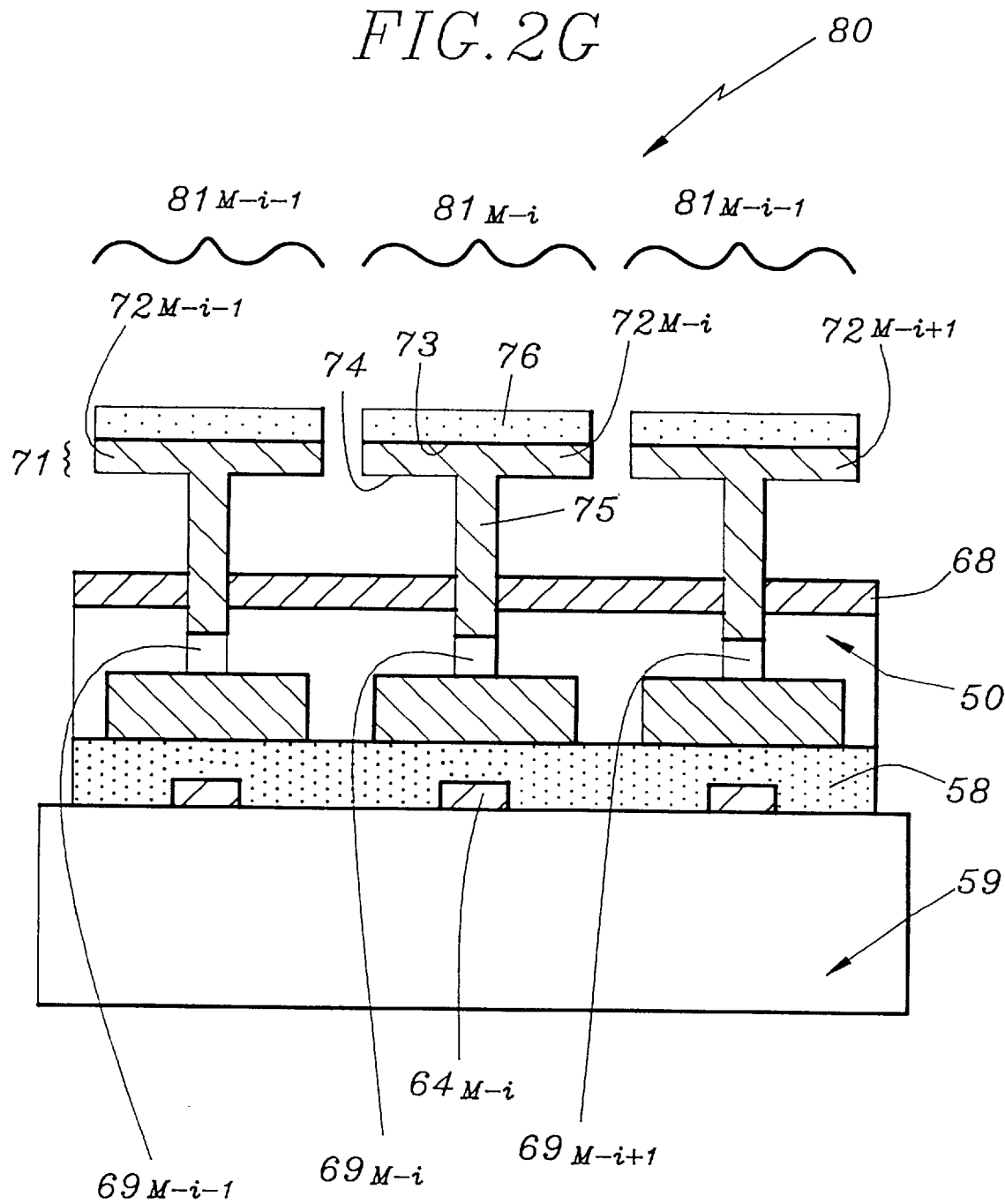

ELECTROSTRICTIVE ACTUATED MIRROR ARRAY AND METHOD FOR THE MANUFACTURE THEREOF

This is a continuation of application Ser. No. 07/312,573, filed Sep. 27, 1994, now abandoned.

FIELD OF THE INVENTION

The present invention relates to an optical projection system; and, more particularly, to an array of electrostrictive actuated mirrors for use in the system and an improved method for manufacturing the same.

BACKGROUND OF THE INVENTION

Among the various video display systems available on the art, an optical projection system is known to be capable of providing a high quality display on a large scale. In such an optical projection system, light from a lamp is uniformly illuminated onto an array of, e.g., M×N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens to thereby display an image thereon.

In FIG. 1, there is shown a cross sectional view of an M×N electrodisplacive actuated mirror array 10 for use in an optical projection system, disclosed in U.S. Pat. No. 5,506,720, comprising: an active matrix 11 including a substrate 12 and an array of M×N transistors thereon; an array 13 of M×N electrodisplacive actuators 30, each of the electrodisplacive actuators 30 including a pair of actuating members 14, 15, a pair of bias electrodes 16, 17, and a common signal electrode 18; an array 19 of M×N hinges 31, each of the hinges 31 fitted in each of the electrodisplacive actuators 30; an array 20 of M×N connecting terminals 22, each of the connecting terminals 22 being used for electrically connecting each of the signal electrodes 18 with the active matrix 11; and an array 21 of M×N mirrors 23, each of the mirrors 23 being mounted on top of each of the M×N hinges 31.

In the above mentioned copending, commonly owned application, there is also disclosed a method for manufacturing such an array of M×N electrodisplacive actuated mirrors, employing a ceramic wafer having a thickness of 30 to 50 $\mu$m.

There are a number of problems associated with the above-described method for manufacturing an array of M×N electrodisplacive actuators, however. First of all, it is rather difficult to obtain a ceramic wafer having a thickness of 30 to 50 $\mu$m; and, furthermore, once the thickness of the ceramic wafer is reduced to a 30 to 50 $\mu$m range, the mechanical properties thereof are likely to degrade which may, in turn, make it difficult to carry out the manufacturing process.

In addition, in mounting the ceramic wafer on the active matrix, the above process utilizes an electrically conductive paste to thereby connect, electrically and mechanically, each of the common signal electrodes with each of the M×N connecting terminals. However, it is possible that the conductive paste may spread to neighboring actuators, which may, in turn, cause short circuits between them.

SUMMARY OF THE INVENTION

It is, therefore, a primary object of the present invention to provide a method for manufacturing an array of M×N electrostrictive actuated mirrors, which dispenses with the use of a thin electrostrictive ceramic wafer.

It is another object of the present invention to provide an improved method for manufacturing an array of M×N electrostrictive actuated mirrors using a thick ceramic wafer, which helps in maintaining the integrity of its mechanical properties and facilitate the manufacturing process.

It is a further object of the present invention to provide a method for manufacturing an array of M×N electrostrictive actuated mirrors, capable of preventing the occurrence of short circuiting between neighbouring actuators.

In accordance with one aspect of the present invention, there is provided a method for manufacturing an array of M×N electrostrictive actuated mirrors for use in an optical projection system, comprising the steps of: (a) preparing a ceramic wafer made of an electrostrictive material, having top and bottom surfaces; (b) forming on the ceramic wafer M regularly spaced, vertically oriented first trenches of a fixed width and depth and M regularly spaced, vertically oriented barriers, each of the barriers having a top flat surface, wherein each of the M trenches runs parallel to each other, extends partially from the top surface to the bottom surface thereof and is separated from each other by each of the barriers; (c) filling each of the M first trenches with an electrically conductive material; (d) providing N−1 horizontally oriented, regularly spaced parallel grooves on the ceramic wafer treated in accordance with said steps(b) and (c), each of the grooves having a same depth as each of the trenches, to thereby generate an array of M×N signal electrodes; (e) covering said ceramic wafer treated in accordance with said steps(b) to (d), inclusive of the N−1 grooves and the top flat surface of the M barriers, with a layer of a dielectric material; (f) mounting said ceramic wafer treated in accordance with said steps(b) to (e) on an active matrix, comprising a substrate and an array of M×N signal pads, using a non conducting adhesive, dispersed therein dielectric ceramic powders having a high dielectric constant, so that each of the signal M×N electrodes is aligned with each corresponding one of the M×N signal pads; (g) providing a metallic layer on the bottom surface of said ceramic wafer treated in accordance with said steps(b) to (f); (h) forming a photoresistive layer on top of the metallic layer; (i) providing on said ceramic wafer N−1 regularly spaced, identical and horizontally directional cuts, thereby forming an array of M×N actuating members; (j) forming on said ceramic wafer treated in accordance with said steps(g) to (i) M regularly spaced, vertically oriented second trenches of a fixed dimension, wherein the centerline of each of the M second trenches coincides with that of each of the M first trenches; (k) removing the photoresistive layer; (l) placing an array of M×N hinges on said ceramic wafer treated in accordance with steps(i) to (k), wherein each of the M×N hinges is provided with a flat top surface and a bottom surface provided with a protrusion for its fitting to each corresponding one of the M second trenches; (m) forming a mirror on the flat top surface of each of the M×N hinges; and (n) making electrical connections to thereby form an array of M×N electrostrictive actuated mirrors.

BRIEF DESCRIPTION OF THE DRAWINGS

The above and other objects and features of the present invention will become apparent from the following description of preferred embodiments given in conjunction with the accompanying drawings, wherein:

FIGS. 2A to 2G represent schematic cross-sectional views illustrating the manufacturing steps in accordance with a preferred embodiment of the present invention.

DETAILED DESCRIPTION OF THE PREFERRED EMBODIMENTS

Figure 1:
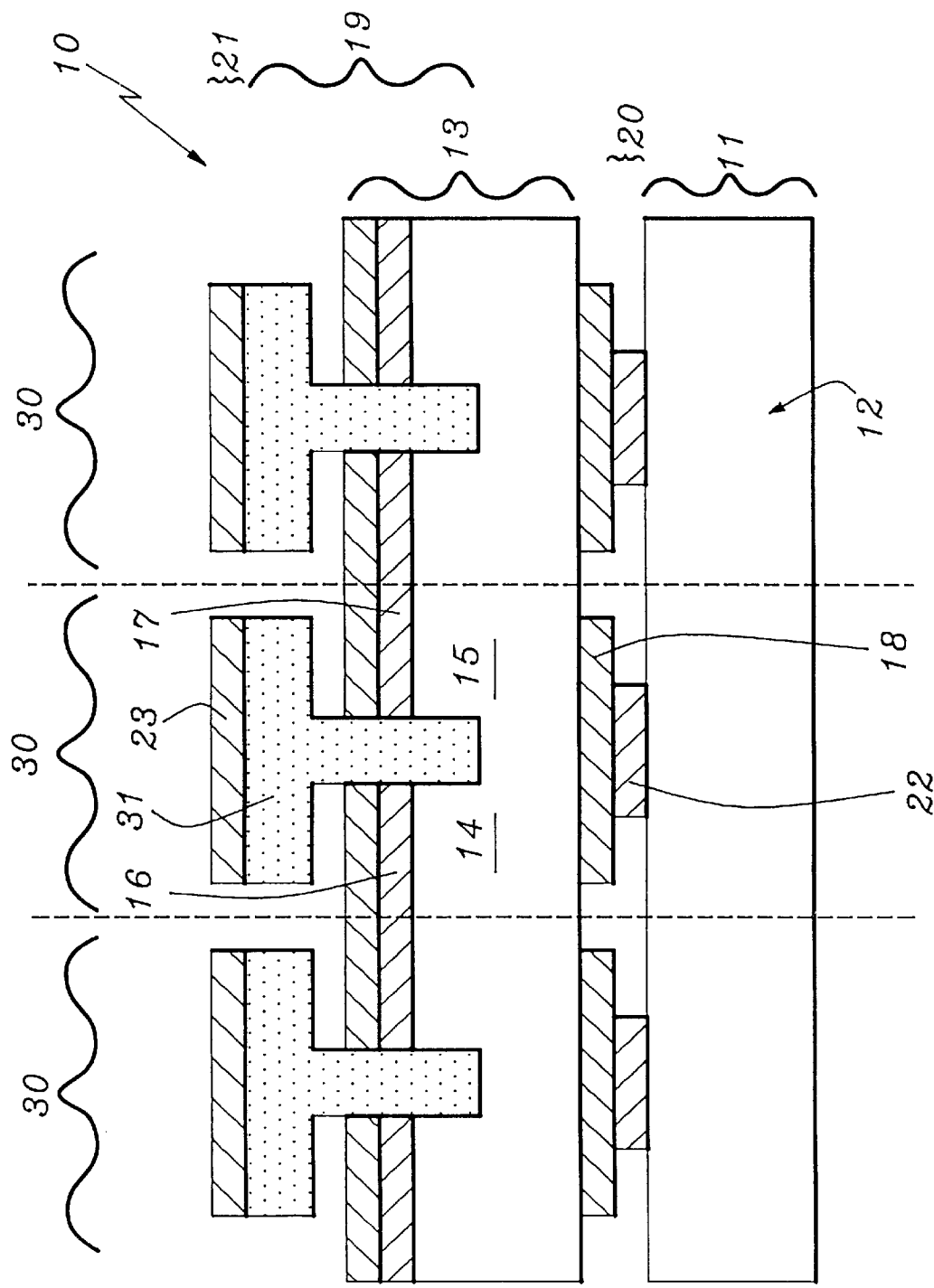
FIG. 1 shows a cross sectional view of a prior art array of M×N electrodisplacive actuated mirrors.
Figure 2A:
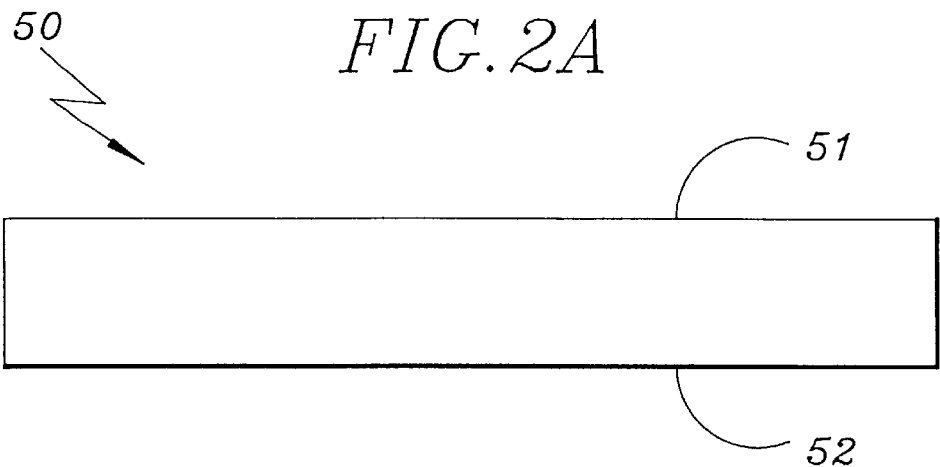

In accordance with the present invention, the process for manufacturing an array of M×N electrostrictive actuated mirrors, wherein M and N are integers, begins with the preparation of a ceramic wafer 50, as shown in FIG. 2A, having a thickness of 100–150 $\mu$m, made of an electrostrictive material, e.g., lead magnesium niobate-lead titanate (PMN-PT) and having top and bottom surfaces, 51, 52, wherein the top and the bottom surfaces, 51, 52, are flat and parallel to each other.

Figure 2B:
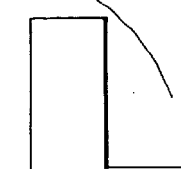

As shown in FIG. 2B, there are formed on the entirety of the top surface 51 of the ceramic wafer 50 M regularly spaced, vertically oriented first trenches of a fixed dimension, e.g., $54_{M-i}$, $54_{M-i+1}$, $54_{M-i+1}$, by using, e.g., a wet etching process in conjunction with a laser beam applied thereon, wherein each of the M first trenches, e.g., $54_{M-1}$, runs parallel to each other, and is separated from each other by a barrier, e.g., $55_{M-1}$, having a top flat surface 56, and i is an integer and less than or equal to M−1. Each of the M first trenches has a width of 50–70 $\mu$m and a depth of 50–100 $\mu$m.

Figure 2C:
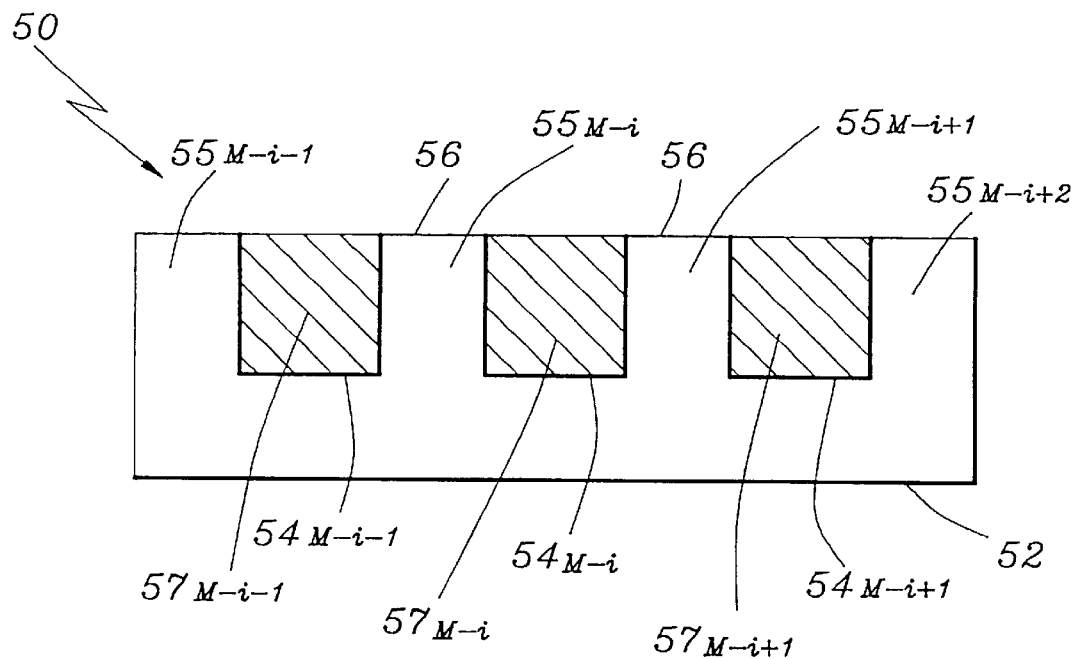
Figure 2D:
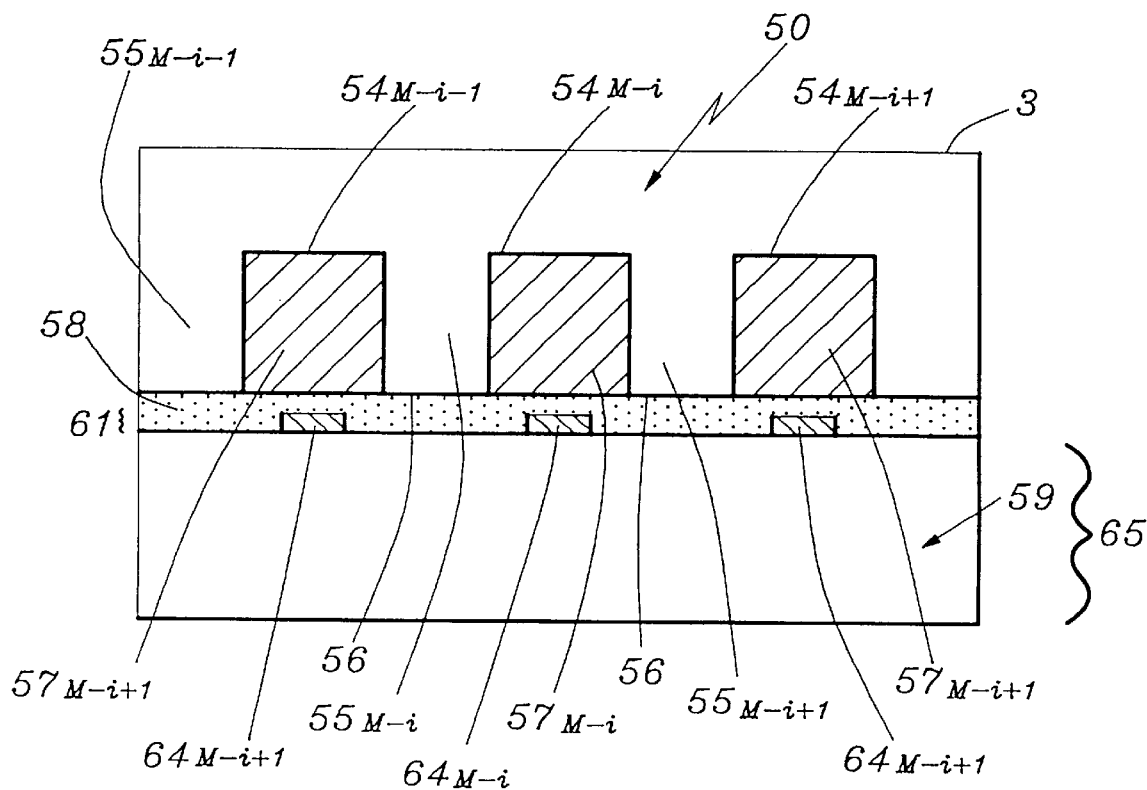

As shown in FIG. 2C, thereafter, M electrodes, e.g., $57_{M-i+1}$, $57_{M-1}$, $57_{M-i+1}$, are formed by filling each of the M first trenches, e.g., $54_{M-i}$, $54_{M-i+1}$, $54_{M-i+1}$, with an electrically conductive adhesive. Subsequently, N−1 horizontally oriented, regularly spaced and parallel grooves(not shown) are made on the top surface 51 of the ceramic wafer 50 treated in accordance with the above described steps, each of the grooves having the same depth as each of the trenches to thereby generate an array of M×N signal electrodes.

Subsequently, the ceramic wafer 50 treated in accordance with above-described manufacturing steps is mounted on an active matrix 65, comprising a substrate 59, an array of M×N transistors(not shown) and an array 61 of M×N signal pads, e.g., $64_{M-i}$, $64_{M-i+1}$, $64_{M-i+1}$, using a nonconducting adhesive 58, dispersed therein $ABO_3$ perovskite type dielectric ceramic powder having a high dielectric constant, e.g., PZT, so that each of the M×N signal electrodes is aligned with each corresponding one of the signal pads.

Figure 2E:
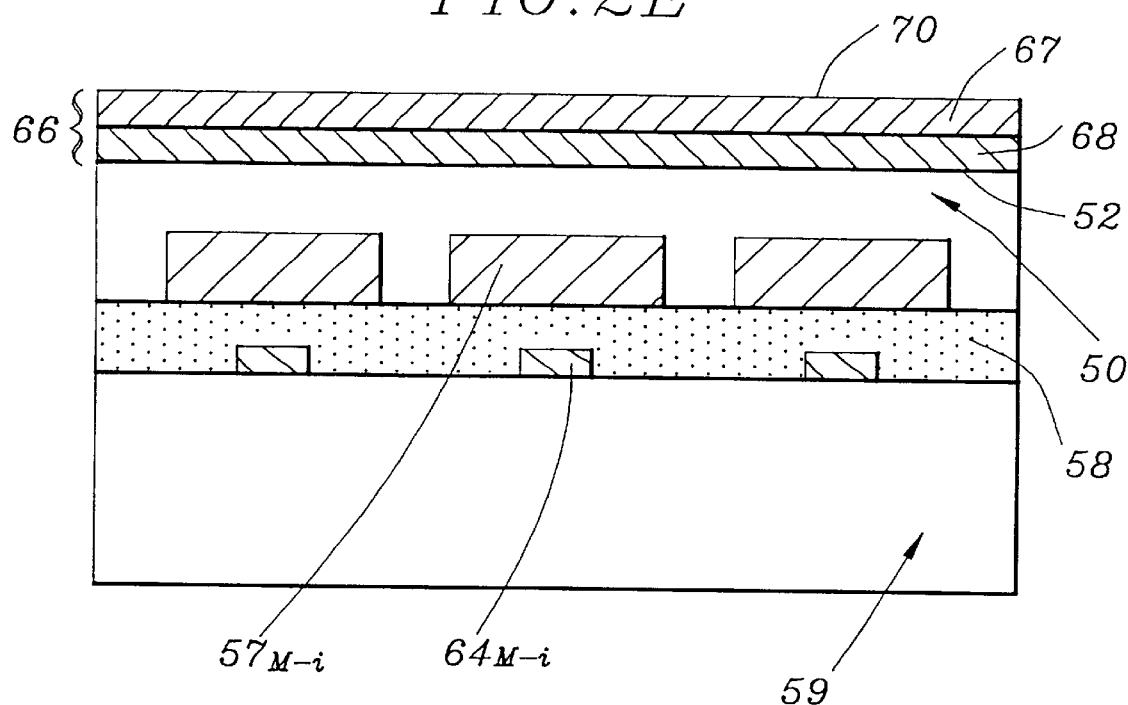

Thereafter, as illustrated in FIG. 2E, a double layer structure 66 consisting of a photoresist layer 67 and metallic layer 68 is provided on the bottom surface 52 of the ceramic wafer 50.

In the subsequent step, N−1 regularly spaced, identical and horizontally oriented cuts are made on the entirety of the bottom surface 52 of the ceramic wafer 50, resulting in an array of M×N actuating members(not shown).

Figure 2F:
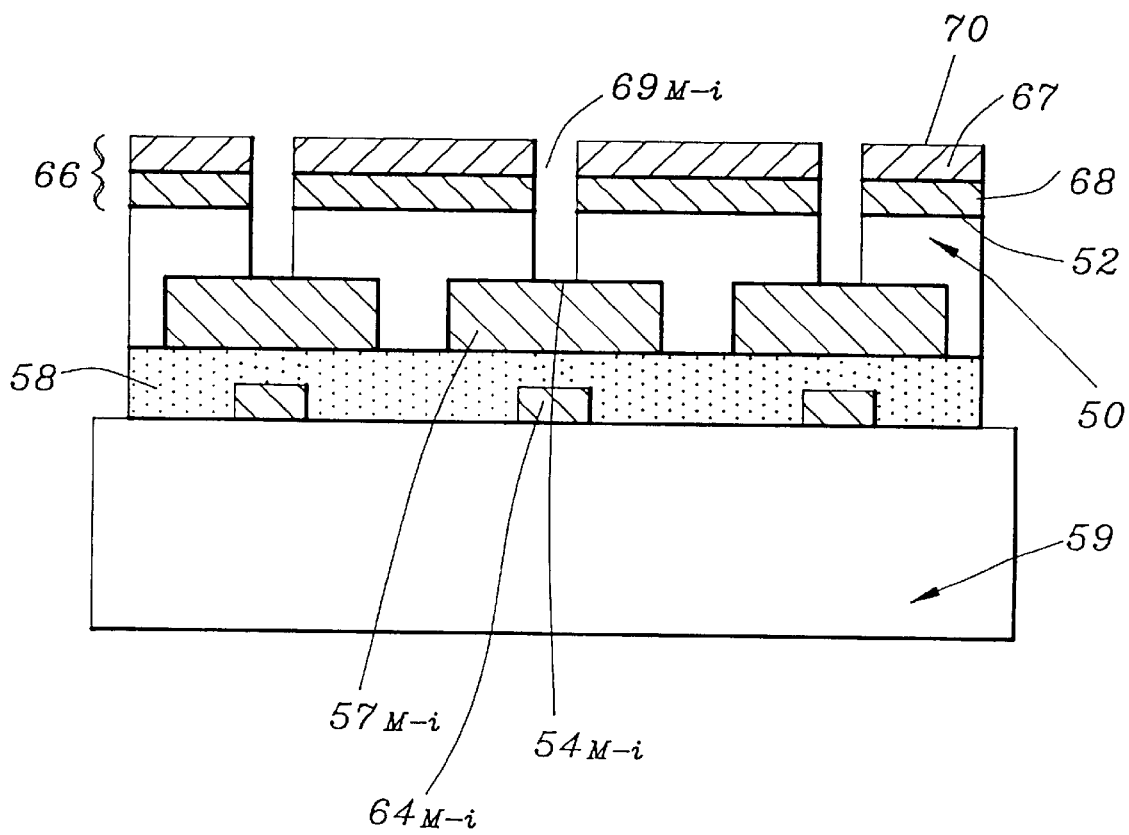

As shown in FIG. 2F, there are formed on the entirety of the bottom surface 52 of the ceramic wafer 50 treated in accordance with above-described step M regularly spaced, vertically oriented second trenches of a fixed dimension, e.g., $69_{M-i-1}$, $69_{M-i}$, $69_{M-i+1}$, wherein each of the M second trenches, e.g., $69_{M-i}$, extends from top of the double layer structure 66 to the corresponding signal electrode, e.g., $57_{M-1}$, and the centerline of each of the M second trenches, e.g., $67_{M-i}$, coincides with that of the corresponding first trenches, e.g., $54_{M-i}$. The herein-described M second trenches are formed by using either a dry etching process or a wet etching process in conjunction with laser beams applied thereto.

In the subsequent step, the photoresist layer 67 is removed. As illustrated in FIG. 2G, thereafter, an array 71 of M×N hinges, e.g., $72_{M-i}$, $72_{M-i+1}$, $72_{M-i+1}$, is placed on the ceramic wafer treated in accordance with the above described steps, wherein each of the M×N hinges, e.g., $72_{M-i}$, has a flat top surface 73 and a bottom surface 74 provided with a protrusion 75 for its fitting to each corresponding one of the M second trenches $69_{M-i}$. Subsequently, a mirror 76, made of a light reflecting material, is formed on the flat top surface 73 of each of the M×N hinges, e.g., $72_{M-i}$, by using, e.g., sputtering, and then, electrical connections are made to thereby form an array 80 of M×N electrostrictive actuated mirrors, e.g., $81_{M-i}$, $81_{M-i+1}$, $81_{M-i+1}$.

While the present invention has been described with respect to certain preferred embodiments only, other modifications and variations may be made without departing from the scope of the present invention as set forth in the following claims.

What is claimed is:

1. A method for manufacturing an array of M×N electrostrictive actuated mirrors for use in an optical projection system, wherein M and N are integers, the method comprising the steps of:

(a) preparing a ceramic wafer made of an electrostrictive material having top and bottom surfaces;

(b) forming on the ceramic wafer M regularly spaced, vertically oriented first trenches of a fixed width and depth and M regularly spaced, vertically oriented barriers, each of the barriers having a top flat surface, wherein each of the trenches runs parallel to each other, extends partially from the top surface to the bottom surface thereof and is separated from each other by each of the barriers;

(c) filling each of the M first trenches with an electrically conductive material;

(d) providing N−1 horizontally oriented, regularly spaced parallel grooves on the ceramic wafer treated in accordance with said steps (b) and (c), each of the grooves having a same depth as each of the trenches, to thereby generate an array of M×N signal electrodes;

(e) covering said ceramic wafer treated in accordance with said steps (b) to (d), inclusive of the N−1 grooves and the top flat surface of the M barriers, with a layer of a dielectric material;

(f) mounting said ceramic wafer treated in accordance with said steps (b) to (e) on an active matrix, comprising a substrate and an array of M×N signal pads, using a nonconducting adhesive, dispersed therein dielectric ceramic powders having a high dielectric constant, so that each of the M×N signal electrodes is aligned with each corresponding one of the M×N signal pads;

(g) providing a metallic layer on the bottom surface of said ceramic wafer treated in accordance with said steps (b) to (f);

(h) forming a photoresistive layer on top of the metallic layer;

(i) providing on said ceramic wafer N−1 regularly spaced, identical and horizontally oriented cuts, resulting in an array of M×N actuating members;

(j) forming on said ceramic wafer treated in accordance with steps (g) to (i) M regularly spaced vertically oriented second trenches of a fixed dimension, wherein the centerline of each of the M second trenches coincides with that of each of the M first trenches;

(k) removing the photoresistive layer;

(l) placing an array of M×N hinges on said ceramic wafer treated in accordance with steps (h) to (k), wherein each of the M×N hinges is provided with a flat top surface and a bottom surface provided with a protrusion for its fitting to each corresponding one of the M second trenches;

(m) forming a mirror on the top surface of each of the M×N hinges; and (n) making electrical connection to thereby form an array of M×N electrostrictive actuated mirrors.

2. The method of claim 1, wherein said ceramic wafer has a thickness of 100–150 $\mu$m.

3. The method of claim 1, wherein each of the M first trenches has a width of 50–70 $\mu$m.

4. The method of claim 3, wherein each of the M first trenches has a depth of 50–100 $\mu$m.

5. The method of claim 4, wherein each of the M first trenches is formed by using a wet etching process in conjunction with laser beams applied thereon.

6. The method of claim 1, wherein each of the M trenches is filled with an electrically conductive adhesive.

7. The method claim 1, wherein the nonconducting adhesive is dispersed with $ABO_3$ perovskite type dielectric ceramic powders.

8. The method claim 1, wherein the set of M second trenches is formed by using a dry etching process.

9. The method of claim 8, wherein the each of the M second trenches extends from the top of the metallic layer to the top of the corresponding signal electrode.

10. The method of claim 1, wherein the set of M second trenches is formed by using a wet etching process in conjunction with laser beams applied thereon.

11. The method of claim 10, wherein each of the M second trenches extends from the top surface of the metallic layer to the top of the corresponding signal electrode.

* * * * *

UNITED STATES PATENT AND TRADEMARK OFFICE

CERTIFICATE OF CORRECTION

PATENT NO.   : 5,862,002
DATED        : January 19, 1999
INVENTOR(S)  : Jeong-Beom Ji It is certified that error appears in the above-identified patent and that said Letters Patent is hereby corrected as shown below:

On the title page

Item  [30]  Foreign Application Priority Data

Sep. 28, 1993   [KR]   Rep. of Korea        93-20259

Signed and Sealed this

Eighth Day of June, 1999

*Attest:*

Q. TODD DICKINSON

*Attesting Officer*   Acting Commissioner of Patents and Trademarks